United States Patent
Saxena et al.

(10) Patent No.: US 11,798,225 B2
(45) Date of Patent: Oct. 24, 2023

(54) 3D BUILDING GENERATION USING TOPOLOGY

(71) Applicant: HERE Global B.V., Eindhoven (NL)

(72) Inventors: Deekshant Saxena, Mumbai (IN); Senjuti Sen, Manpada (IN)

(73) Assignee: HERE Global B.V., Eindhoven (NL)

( * ) Notice: Subject to any disclaimer, the term of this patent is extended or adjusted under 35 U.S.C. 154(b) by 149 days.

(21) Appl. No.: 17/399,783

(22) Filed: Aug. 11, 2021

(65) Prior Publication Data
US 2023/0046926 A1    Feb. 16, 2023

(51) Int. Cl.
| | |
|---|---|
| *G06T 15/04* | (2011.01) |
| *G06T 17/05* | (2011.01) |
| *G06T 5/00* | (2006.01) |
| *G06T 7/55* | (2017.01) |
| *G06T 17/00* | (2006.01) |
| *G06T 15/20* | (2011.01) |

(52) U.S. Cl.
CPC ............ *G06T 15/205* (2013.01); *G06T 5/002* (2013.01); *G06T 7/55* (2017.01); *G06T 15/04* (2013.01); *G06T 17/00* (2013.01); *G06T 17/05* (2013.01); *G06T 2207/10016* (2013.01); *G06T 2207/20081* (2013.01); *G06T 2207/20084* (2013.01); *G06T 2210/04* (2013.01)

(58) Field of Classification Search
CPC ......... G06T 15/205; G06T 15/04; G06T 5/02; G06T 17/05; G06T 2207/20081; G06T 2207/20084; G06T 7/55; G06T 17/00; G06T 2207/10016; G06T 2210/04; G06F 30/13; G06F 30/27
See application file for complete search history.

(56) References Cited

U.S. PATENT DOCUMENTS

| | | | | |
|---|---|---|---|---|
| 2013/0097197 A1* | 4/2013 | Rincover | ........... | G01C 21/3664 707/E17.014 |
| 2020/0162641 A1* | 5/2020 | Thota | ..................... | H04N 5/147 |

(Continued)

FOREIGN PATENT DOCUMENTS

CN    111126218 A    5/2020

OTHER PUBLICATIONS

Shu, Dule, James Cunningham, Gary Stump, Simon W. Miller, Michael A. Yukish, Timothy W. Simpson, and Conrad S. Tucker. "3d design using generative adversarial networks and physics-based validation." Journal of Mechanical Design 142, No. 7 (Jul. 2020): 071701 (Year: 2020).*

(Continued)

*Primary Examiner* — King Y Poon
*Assistant Examiner* — Vincent Peren
(74) *Attorney, Agent, or Firm* — LEMPIA SUMMERFIELD KATZ LLC

(57) ABSTRACT

Embodiments provide systems and methods for three-dimensional building generation from machine learning and topological models. The method uses topology models that are converted into vertices and edges. A BGAN (Building generative adversarial network) is used to create fake vertices/edges. The BGAN is then used to generate random samples from seen sample of different structures of building based on relationship of vertices and edges. The embeddings are then fed into a machine trained network to create a digital structure from the image.

16 Claims, 13 Drawing Sheets

(56) References Cited

U.S. PATENT DOCUMENTS

2020/0302231 A1    9/2020  Nawhal et al.
2021/0287430 A1*   9/2021  Li .......................... G06F 18/217

OTHER PUBLICATIONS

Nie, Zhenguo, et al. "TopologyGAN: Topology Optimization Using Generative Adversarial Networks Based on Physical Fields Over the Initial Domain." Journal of Mechanical Design 143.3. Mar. 11, 2020: 031715. (pp. 1-18).

Xiong, Yun, et al. "Dyngraphgan: Dynamic Graph Embedding via Generative Adversarial Networks." International Conference on Database Systems for Advanced Applications. Springer, Cham, Apr. 24, 2019. (pp. 1-17).

Zhang, Sheng, Rui Song, and Wenbin Lu. "GraphCGAN: Convolutional Graph Neural Network with Generative Adversarial Networks." 2021. (pp. 1-10).

* cited by examiner

3D BUILDING GENERATION USING TOPOLOGY

FIELD

The following disclosure relates to navigation devices or services.

BACKGROUND

Three-dimensional (3D) building model are important in urban planning and navigational services. three-dimensional building models, three-dimensional terrain models, and three-dimensional roadway models enhance visual depiction and simplify the recognition of locations. three-dimensional models play a vital role in developing navigation systems. three-dimensional maps provide display and visualizations that are closer to reality and delivers superior orientation to end-users. As an example, GPS-based navigation systems typically use views of simplified (two-dimensional or isometric) road maps to guide drivers to their destination. However, drivers often experience difficulties in linking a typical two-dimensional overhead map with the visual impression that they get from the actual environment or driving experience, which is inherently ground-level based. Therefore, supplying three-dimensional building models from ground-level views proves very useful for pre-visualizing an upcoming traffic situation.

Three-dimensional building models can also be used for route finding and accessibility with pedestrian applications such as evacuation, navigating public places, and determining indoor routes. three-dimensional building models in pedestrian navigation also help in improving road safety and providing data that are not available in two-dimensional like ramps and steps. Other benefits of three-dimensional buildings include being used as a tool for intelligent and smart transportation. three-dimensional building and city models can help to improve traffic regarding security, sustainability, and reduced costs in terms of time, money, energy, and environmental impact. Various instances where three-dimensional building and city models help are timely update of traffic data, the request of the equipment needed to assist in emergencies using the data provided by vehicles, and the tracking of deliveries or goods along their journey.

Three-dimensional building models reconstruction may be performed from different data resources, such as LiDAR, point clouds, airborne images, satellite images, UAV (unmanned air vehicle) images or combinations of digital surface model data with cadastral maps. Three-dimensional building reconstruction typically involves three labor intensive steps: building detection, extraction, and reconstruction. The reconstruction of the buildings is a process for generating a model using features obtained from building detection and extraction. Detection and extraction are typically done using ranging-based sensors such as LiDAR or other point cloud generating devices. Overhead or aerial imaging are also very popular.

Ranging based sensors, however, are expensive and limited in their ability to cover a large region. Aerial images, similarly, are expensive and not always timely available. There is a need for three-dimensional building reconstruction using easy to acquire street level images such as those taken by smartphones or other handheld devices. Currently, attempts have been made to use such images combined with machine learning techniques. These machine learning models are typically focused on creating two-dimensional pixel-based image recognition or using depth of a single image to create three-dimensional buildings (assuming machine learning on images without using lidar). However, when doing this topology information is lost or is not fully utilized. Another popular machine learning non-lidar technique used for three-dimensional building generation from machine learning is semantic segmentation where the images are trained on various images (two-dimensional/three-dimensional), e.g., a semi supervised classification model dependent on manual segmentation first. These methods are labor intensive and while they produce passible facades of three-dimensional buildings, they lack the full topology of the three-dimensional building and thus are incomplete for certain aspects or applications.

SUMMARY

In an embodiment, a method is provided for generating three-dimensional digital buildings from two-dimensional images. The method includes acquiring a two-dimensional image of a building; inputting the two-dimensional image into a machine trained network configured to generate three-dimensional structures when input two-dimensional images and a plurality of synthetic topology data generated using a generative adversarial network; outputting a three-dimensional building digital structure of the building; and providing the three-dimensional building digital structure.

In an embodiment, a system is provided for generating three-dimensional digital buildings from two-dimensional images. The system includes a communications interface, a building generative adversarial network, a machine trained network, and a geographic database. The communications interface is configured to receive a two-dimensional image of a building. The building generative adversarial network is configured to generate synthetic topology embeddings. The machine trained network is configured to input the two-dimensional image and the synthetic topology embeddings and output a three-dimensional structure of the building. The geographic database is configured to store mapping data including at least the three-dimensional structure of the building for use by navigation applications and services.

In an embodiment, a non-transitory computer implemented storage medium is provided that stores machine-readable instructions executable by at least one processor, the machine-readable instructions comprising: acquiring a two-dimensional image of a building; inputting the two-dimensional image into a machine trained network configured to generate three-dimensional structures when input two-dimensional images and a plurality of synthetic topology data generated using a generative adversarial network; outputting a three-dimensional building digital structure of the building; and providing the three-dimensional building digital structure.

BRIEF DESCRIPTION OF THE DRAWINGS

Exemplary embodiments of the present invention are described herein with reference to the following drawings.

DETAILED DESCRIPTION

Embodiments provide systems and methods for three-dimensional building generation from machine learning and topological models. Embodiments provide an architecture referred to as BGAN (Building Generative adversarial network) in tandem with a network referred to as DCGNN (Deep convolutional graph neural network). The method uses topology models that are converted into vertices and edges. The BGAN is used to create fake nodes in addition to actual nodes (vertices) that are then fed into a machine trained network to generate relationship of edges between all nodes. The BGAN is then used to generate random samples from seen sample of different structures of building based on relationship of vertices and edges and distance of those from bottom. The embeddings are then fed into a machine trained network to create a digital structure from the image. The beneficial aspects are an efficient method to create three-dimensional buildings without any expensive equipment like Lidar or expensive manual methods like semantic segmentation.

The following embodiments relate to several technological fields including but not limited to navigation, autonomous driving, assisted driving, traffic applications, and other location-based systems. In each of the technologies of navigation services, autonomous driving, assisted driving, traffic applications, and other location-based systems, improved identification and generation of three-dimensional building structures improves the ability of the mapping system to provide a safe and satisfactory trip. In addition, users of navigation, autonomous driving, assisted driving, traffic applications, and other location-based systems are more willing to adopt these systems given the technological advances in improved visualization of the roadway.

Figure 1:
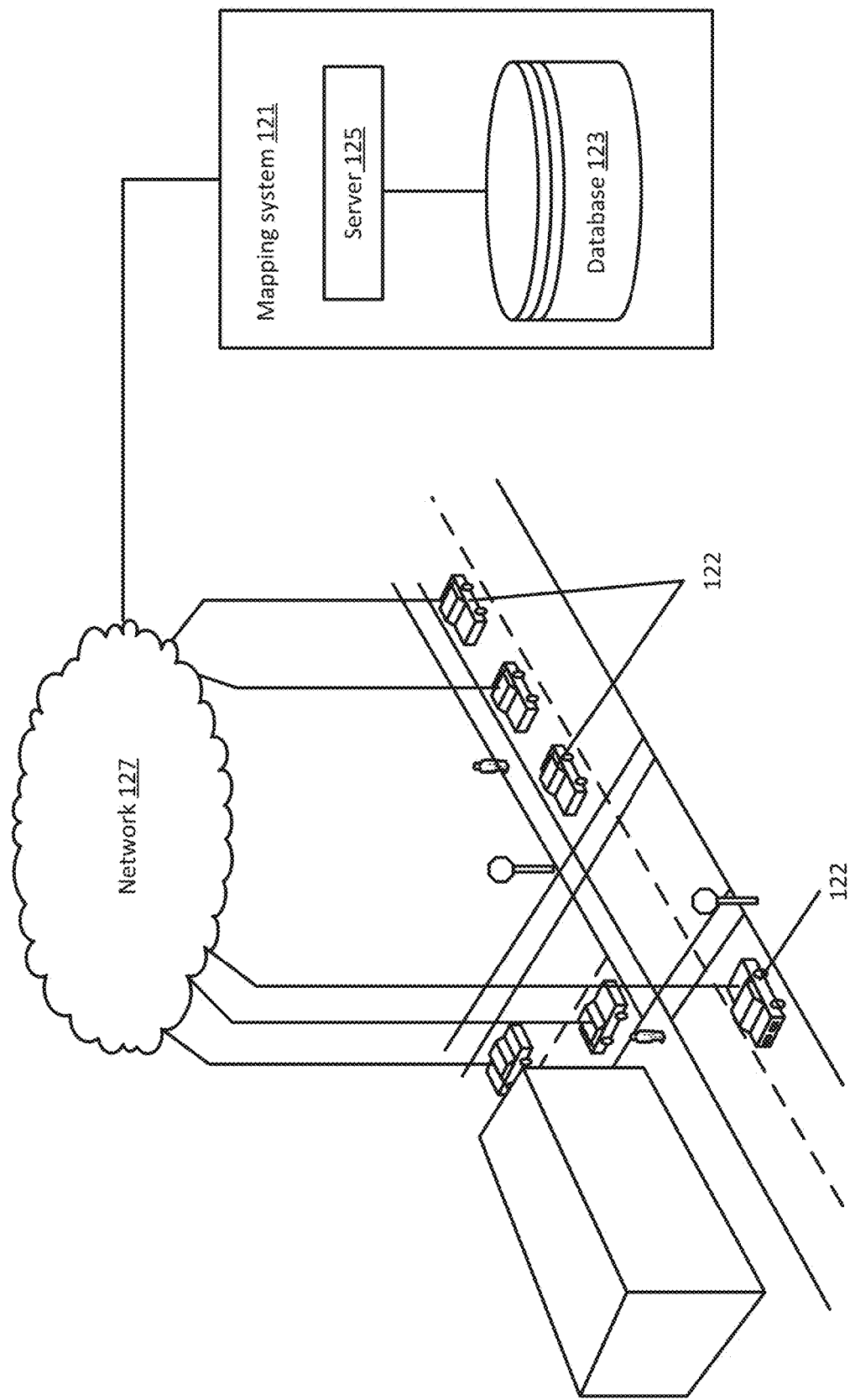
FIG. 1 depicts an example system for three-dimensional building generation from machine learning and topological models according to an embodiment.

FIG. 1 depicts a system for three-dimensional building generation from a two-dimensional image using synthetic topology embeddings. The system includes at least one or more devices 122, a network 127, and a mapping system 121. The mapping system 121 may include a database 123 (also referred to as a geographic database 123 or map database) and a server 125. Additional, different, or fewer components may be included. In an embodiment, the one or more devices 122 are configured to acquire two-dimensional image data of one or more buildings. The server 125 is configured to generate three-dimensional structural models of the one or more buildings from a two-dimensional image of a respective building using one or more trained networks stored at the mapping system 121. The two-dimensional image data and three-dimensional structural models are stored in the geographic database 123 and made available for use by navigation applications provided by the mapping system 121.

The one or more devices 122 are configured to acquire image data. The one or more devices 122 may include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire image data and/or roadway data. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

One or more of the devices 122 may be configured to provide probe reports to the mapping system 121 while traversing a roadway network. Each vehicle and/or mobile device 122 may include position circuitry such as one or more processors or circuits for generating probe data. The probe data may be generated by receiving Global Navigation Satellite System (GNSS) signals and comparing the GNSS signals to a clock to determine the absolute or relative position of the vehicle and/or mobile device 122. The probe data may be generated using embedded sensors or other data relating to the environment of a vehicle or device 122. The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The one or more devices 122 are configured to acquire image data using one or more cameras embedded in or in communication with the one or more devices 122. The image data includes at least one building or structure in the vicinity of the roadway. The image data is transmitted to the mapping system 121 for storage in the geographic database 123 and processing by the server 125. The image data may include metadata, for example, attributes about an image, such as its height and width, in pixels. The metadata may describe the content of the image, the date and time of the image, etc. The metadata may be used by the server 125 when providing the three-dimensional building structure to an application by, for example, locating the building in relation to the roadway or other structures.

To communicate with the devices 122, systems or services, the mapping system 121 is connected to the network 127. The mapping system 121 may receive or transmit data through the network 127. The mapping system 121 may also transmit paths, routes, or risk data through the network 127. The mapping system 121 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The mapping system 121 may include multiple servers 125, workstations, databases, and other machines connected together and maintained by a map developer. A high-definition map and the geographic database 123 are maintained and updated by the mapping system 121. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive.

The server(s) 125 may be a host for a website or web service such as a mapping service and/or a navigation service. The mapping service may provide standard maps or HID maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 is configured to communicate with the devices 122 through the network 127. The server 125 is configured to receive a request from a device 122 for a route or maneuver instructions and generate one or more potential routes or instructions using data stored in the geographic database 123.

In an embodiment, the server 125 is configured to receive image data from a device 122 that includes a depiction of at least one building. The server 125 is configured to generate a three-dimensional structural model of the at least one building using at least a trained network (functional CNN) that is configured to input two-dimensional images, synthetic embeddings (generated using a BGAN), and output a rough digital structure that may be smoothed and textured. The resulting three-dimensional structural model may be stored in the geographic database 123 and provided for use in navigation services such as displaying a route from a starting point to a destination.

Figure 2:
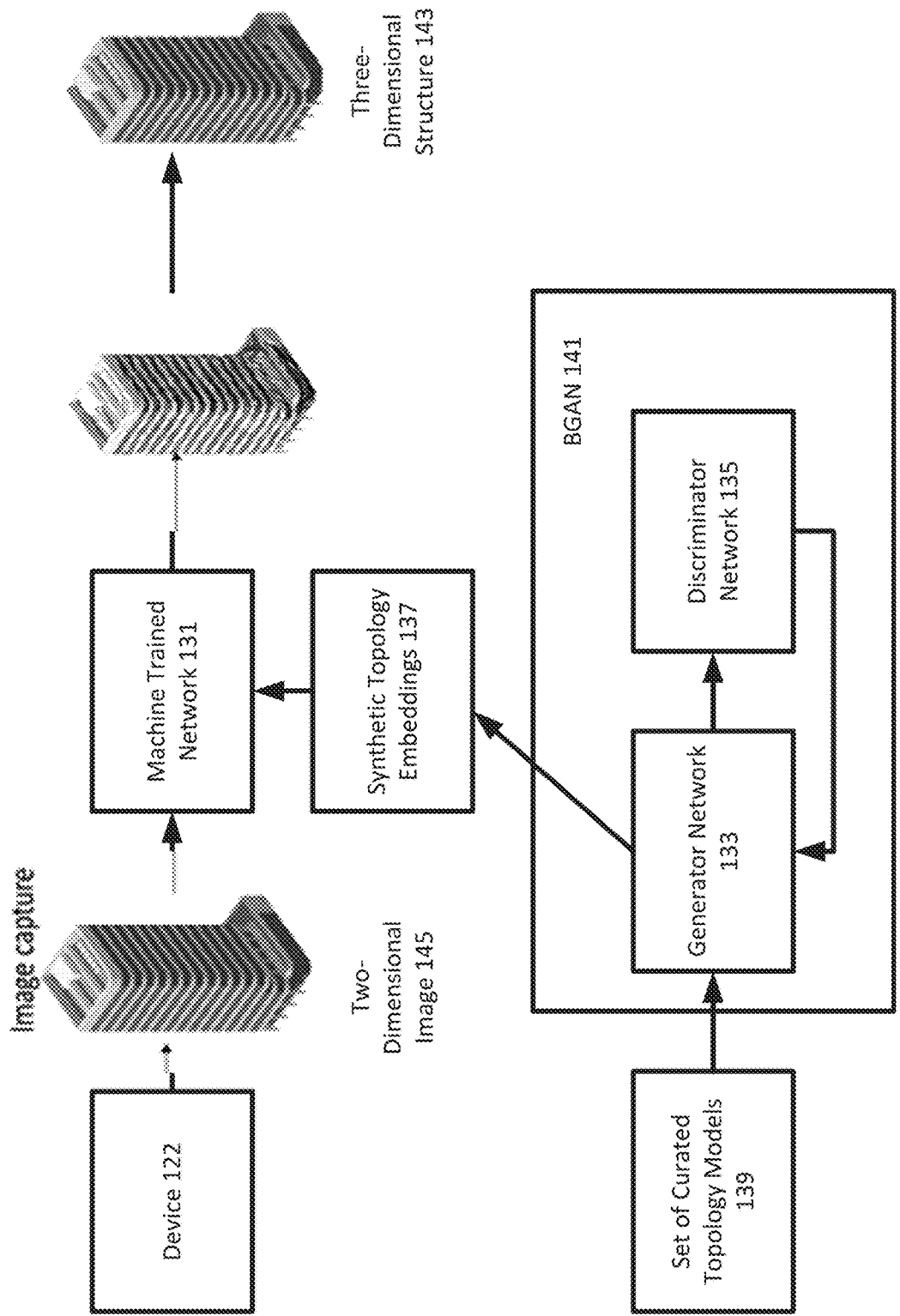
FIG. 2 depicts an example of the workflow for the server of FIG. 1 according to an embodiment.

FIG. 2 depicts an example of the components in the mapping system 121. Each component may be provided by a server 125 and/or stored in a memory/database included with the mapping system 121. The depicted components include a BGAN 141 including a generator network 133 and a discriminator network 135, a machine trained network 131, a set of curated topology models 139, synthetic topology embeddings 137 generated by the BGAN 141, a two-dimensional image 145 provided by the device 122 and an output three-dimensional structure 143.

The mapping system 121 includes a machine trained network 131 referred to as a building generative adversarial network or BGAN 141. The BGAN 141 includes a generator network 133 and a discriminator network 135 that are trained adversarially. The BGAN 141 is trained to generate synthetic graph embeddings 137 that relate to the topology of buildings. Graph embeddings are the transformation of property graphs to a vector or a set of vectors. Embedding capture the graph topology, vertex-to-vertex relationship, and other relevant information about the graphs, subgraphs, and vertices.

The embeddings 137 generated by the BGAN 141 and associated methods are based on graph theory. Graph theory is a branch of mathematics used to model relations between objects. A simple graph G consists of a set of points called vertices, and the lines that join pairs of points are called edges. The degree of a vertex in a graph is the number of edges connected to it. Vertices that are connected by an edge are called adjacent vertices. Similarly, edges that share a common vertex are called adjacent edges. Any two graphs that have a one-to-one correspondence between the number vertices, the number of edges and the degree of vertices are called isomorphic graphs.

Figure 3A:
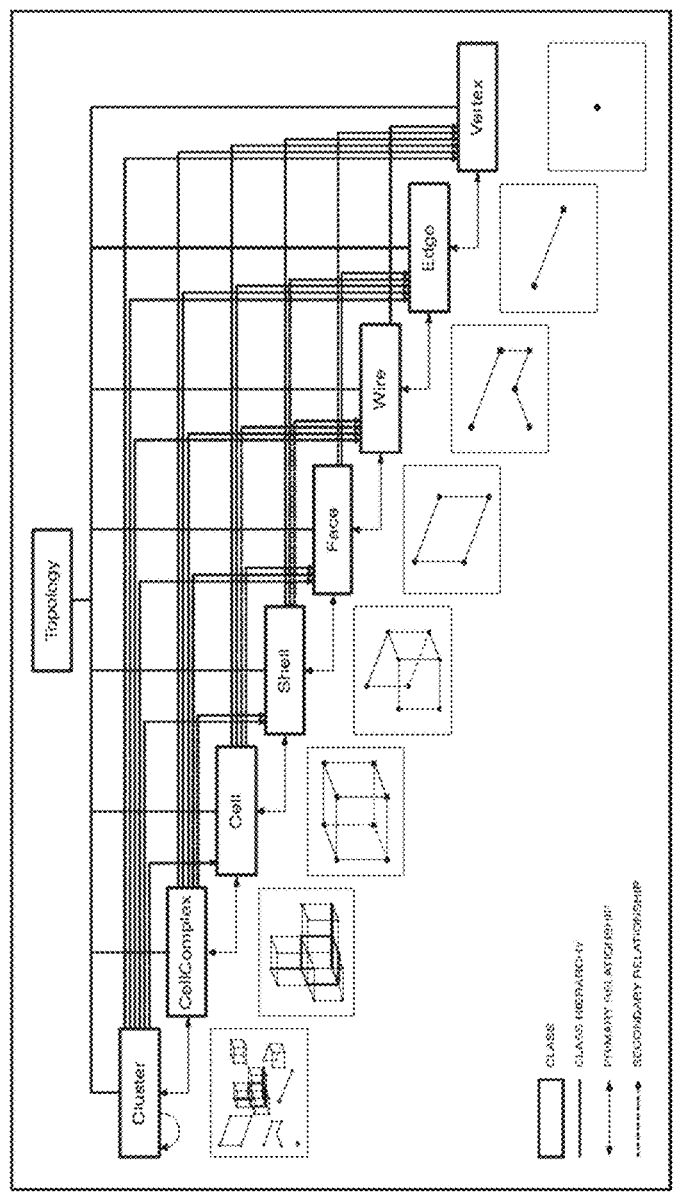
FIG. 3A depicts an example of Topology classes.

In an embodiment the topology is defined using an open-source software modelling library called topologic that enables hierarchical and topological representations of architectural spaces, buildings and artifacts through non-manifold topology. Topologic contains the following main classes as depicted in FIG. 3A. A Topology is an abstract superclass that stores constructors, properties and methods used by other subclasses that extend it using a topological framework with the following eight entities, arranged from the highest level of dimensionality to the lowest: Cluster, CellComplex, Cell, Shell, Face, Wire, Edge, and Vertex. Each entity may contain other lower-level entities (with the exception of a Cluster in which another Cluster can be contained). A Vertex is a zero-dimensional entity equivalent to a geometry point. An Edge is a one-dimensional entity defined by two vertices. While a topologic edge is made of two vertices, its geometry may be a curve with multiple control vertices. A Wire is a contiguous collection of Edges where adjacent Edges are connected by shared Vertices. A Wire may be open or closed and may be manifold or non-manifold. A Face is a two-dimensional region defined by a collection of closed Wires. The geometry of a face can be flat or undulating. A Shell is a contiguous collection of Faces, where adjacent Faces are connected by shared Edges. A Shell may be open or closed and may be manifold or non-manifold. A Cell is a three-dimensional region defined by a collection of closed Shells. A Cell may be manifold or non-manifold. A CellComplex is a contiguous collection of Cells where adjacent Cells are connected by shared Faces. A CellComplex is nonmanifold. A Cluster is a collection of any topologic entities. A Cluster may be contiguous or not and may be manifold or non-manifold. Clusters can be nested within other Clusters. Other classes may be used such as context or graphs. A Context defines a topological relationship between two otherwise independent Topologies. A Graph is a Wire that is defined by the topology of a CellComplex or a Shell. It can be manifold or non-manifold.

Figure 3B:
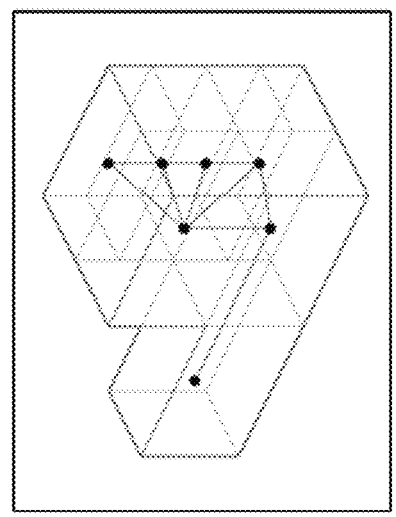
FIG. 3B depicts an example of a CellComplex of FIG. 3A.
Figure 4A:
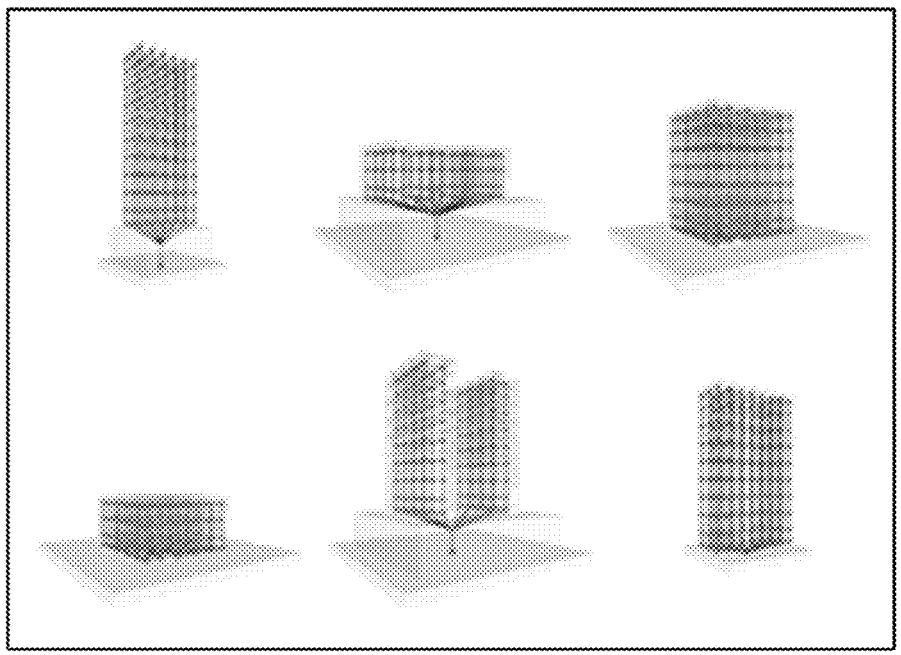
FIG. 4A depicts an example of topology-based building structures.
Figure 4B:
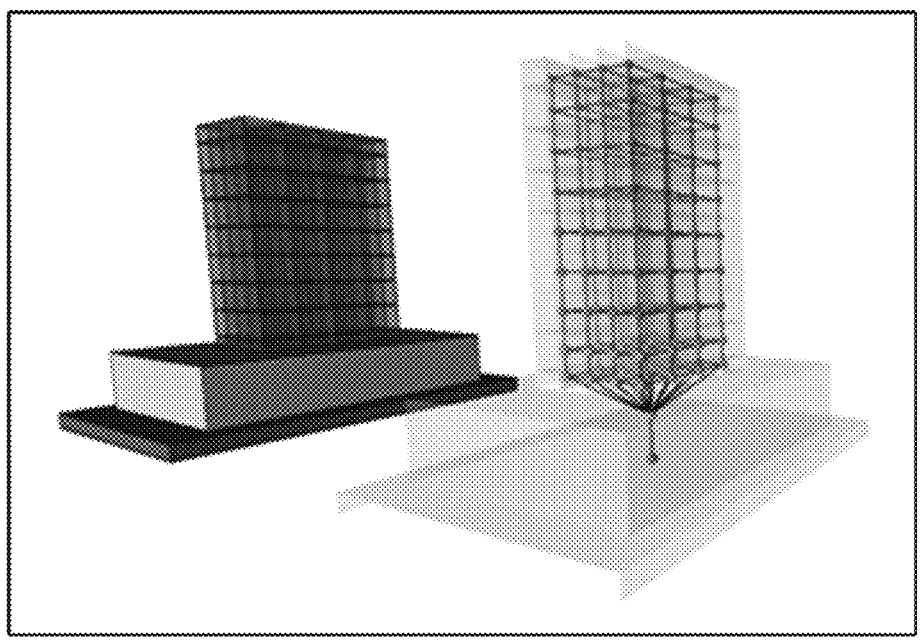
FIG. 4B depicts an example of a topology-based building structure and a rendered structure.

The BGAN 141 accept as input any Topology with additional optional parameters and outputs a Graph. In its simplest form, the dual graph of a CellComplex is a Graph that connects the centroids of adjacent Cells with a straight Edge. In Topologic, a CellComplex is made of enclosed three-dimensional spatial units (Cells) that share Faces. Cells that share Faces are called adjacent Cells. FIG. 3B depicts an example Dual Graph of the CellComplex. Each Cell is represented by a Vertex and the Vertices of adjacent Cells are connected by an Edge. Topologic enables the embedding of arbitrary dictionaries in any topology. As topologies undergo geometric operations (e.g., slicing a Cell into several smaller Cells thus creating a CellComplex), the dictionaries of operand topologies are transmitted to resulting topologies. Furthermore, when a dual graph is created from a Topology, the dictionaries of the constituent topologies get transferred to their corresponding vertices. FIG. 4A depicts an example of curated topology graphs that have been transformed into building structures. FIG. 4B depicts an example graph and a skin applied to the building structure to generate a three-dimensional building structure.

Figure 5:
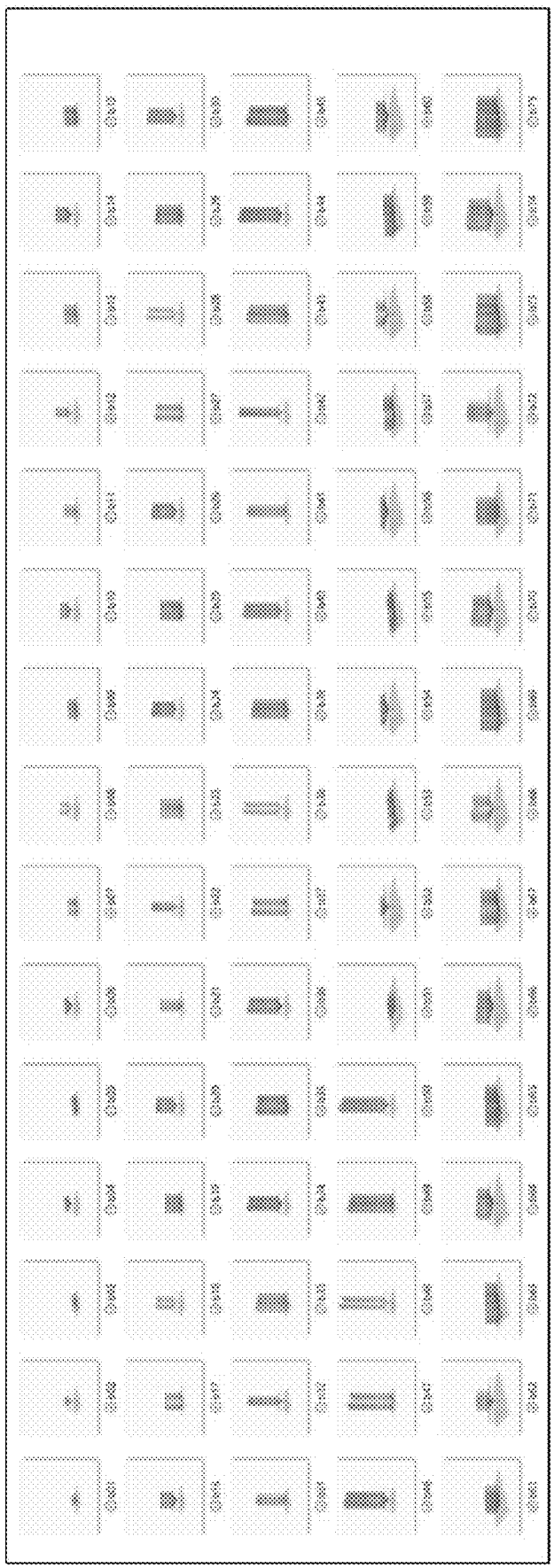
FIG. 5 depicts an example of topology embeddings.

The BGAN 141 uses the rules of Topologic to generate synthetic embeddings 137 that represent plausible building structures. FIG. 5 depicts an example of topology graph embeddings. The BGAN 141 is configured to generate additional topology graph embeddings (synthetic embeddings 137) in order to provide better training and operation of the machine learned network that is configured to transform the two-dimensional image 145 into the three-dimensional structure 143. The BGAN 141 includes at least a generator 133 and discriminator 135. The generator 133 generates synthetic graphs that are judged by the discriminator 135. Alternatively, the generator 133 generates synthetic vertices that are input into a graph network that generates graphs/embeddings. A set of real graphs, e.g., similar to real world buildings/embeddings are also provided. The discriminator 135 is a classifier configured to identify which graphs are from the real set and which are fake (e.g., generated by the generator 133 with one or more fake vertices/parameters). In an example, the generator 133 attempts to fool the discriminator 135 using carefully crafted embeddings 137 that have synthetic or fake vertices that look almost right but not quite. This is done by picking a legitimate sample randomly from training set (latent space) and synthesizing a new graph by randomly altering its features (by adding random noise). As an example, the generator 133 may input an existing graph and can add an extra vertex to the graph providing another floor or room. The result is a graph very similar to a normal building graph with the exception of the number of floors or rooms. During training, the discriminator 135 is presented with a random mix of legitimate topography graphs from training data as well as fake topography graphs generated by the generator 133. Its task is to identify correct and fake inputs. Based on the outcome, both machines try to fine-tune their parameters and become better in what they do. If the discriminator 135 makes the right prediction, the generator 133 updates its parameters in order to generate better fake samples to fool the discriminator 135. If the discriminator's prediction is incorrect, it tries to learn from its mistake to avoid similar mistakes in the future. The reward for the discriminator 135 is the number of right predictions and the reward for the generator 133 is the number of the discriminator's errors. This process continues until an equilibrium is established and the discriminator's training is optimized.

In an embodiment, the generator 133 generates the fake vertices/edges which are then input into a graph network (e.g., GNN) that transforms the vertices/edges into the graph embeddings 137 that are then judged or criticized by the discriminator 135. The GNN may be configured as a CNN, e.g., a GCNN. In an embodiment, for a given vertex, the generator 133 tries to fit its underlying true connectivity distribution over all other vertices and produces "fake" samples to fool the discriminator 135, while the discriminator 135 tries to detect whether the sampled vertex is from ground truth or generated by the generator 133. With the competition between these two models, both of them can alternately and iteratively boost their performance.

Different network configurations and embeddings 137 may be used for the BGAN 141. For example, within a graph, one may want to extract different kind of information. Whole graph embedding may be used when studying several graphs. Node embedding may be used to describe individual or sets of vertices. Approaches for node embedding may be divided into three major groups: factorization approaches, random walk approaches, and deep approaches. In an embodiment, the generator 133 uses random walks to produce embeddings 137. The random walk starts in a selected node and then moves to a random neighbor from a current node for a defined number of steps. For a random walk, the generator 133, for example a stochastic neural network with discrete output samples, learns to generate random walks that are plausible in a real graph, while the discriminator 135 then has to distinguish them from the true ones that are sampled from the real graph. In another configuration, the goal of the generator 133 is to generate synthetic random walks that are plausible in the input graph. At the same time, the discriminator 135 learns to distinguish the synthetic random walks from the real ones that come from the training set. Both the generator 133 and the discriminator 135 are trained end-to-end using backpropagation. At any point of the training process, it is possible to use the generator 133 to generate a set of random walks, that may then be used to produce an adjacency matrix of a new generated graph.

In an embodiment, the generator 133 tries to fit the underlying true connectivity distribution as much as possible, and generates the most likely vertices to be connected with a respective vertex. The discriminator 135 tries to distinguish well-connected vertex pairs from ill-connected ones, and calculates the probability of whether an edge exists. In an embodiment, the generator 133 tries to approximate the underlying true connectivity distribution, and generates (or selects) the most likely vertices to be connected. The discriminator 135 tries to discriminate the connectivity for the vertex pair and outputs a single scalar representing the probability of an edge existing between the pair.

In an embodiment, the generator 133 is configured as or connects to a Deep Graph Convolutional Neural Network (DGCNN). In an example, the generator 133 provides fake vertices which the DGCNN adds to existing graphs and provides to the discriminator 135. The DGCNN provides an end-to-end deep learning system for classifying graph-based data. One of the main advantages of DGCNN is that it accepts arbitrary graphs without the need to first convert them into vectors. DGCNN accomplishes this by first passing the inputted graph through multiple graph convolution layers where node information is propagated between neighbors. Then a second layer sorts the graph vertices in a consistent order which are then inputted into a traditional convolutional neural network. By sorting the vertex features rather than summing them up, DGCNN keeps far more information thus allowing it to learn from global graph topology. The DGCNN has three sequential stages: 1) graph convolution layers extract vertices' local substructure features and define a consistent vertex ordering; 2) a Sort Pooling layer sorts the vertex features under the previously defined order and unifies input sizes; 3) traditional convolutional and dense layers read the sorted graph representations and make predictions.

Once trained, the BGAN 141 is configured to output synthetic embeddings 137 that represent possible graphs of building structures. The BGAN 141 is used to generate random samples from seen sample of different structures of building based on relationship of vertices and edges and distance of those from bottom. the embeddings 137 are then fed into a network to create digital structure of images acquired from, for example, the one or more devices 122.

The server 125 also includes a machine trained network 131 that is configured to generate a three-dimensional structure 143 from a two-dimensional image 145. In an embodiment, the machine trained network 131 is configured to identify shapes of the building in the two-dimensional image 145, compare the shapes with the embeddings 137, and output a three-dimensional structural model of the building. Different neural network configurations and workflows may be used for the machine trained network 131 such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of an image). The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

The machine trained network 131 may be defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

In an embodiment, the machine trained network 131 comprises an encoder/decoder network. A single image is only a projection of a three-dimensional object into a two-dimensional plane, so some data from the higher dimension space must be lost in the lower dimension representation. Therefore, from a single-view two-dimensional image 145, there will never be enough data construct its three-dimensional component. A method to create the three-dimensional view from a single two-dimensional image 145 therefore requires prior knowledge of the three-dimensional shape in itself. The topology embeddings 137 are used by the network as the prior knowledge of potential three-dimensional building structures. In other words, possible variations that the captured image could be mapped to/aligned with. In an embodiment, the network is a network that takes in a random input vector (values representing the data set's features) and generates a continuous voxel representation (values on a grid in three-dimensional space) of the three-dimensional object. Then, it feeds the voxels to a non-differentiable rendering process, which thresholds them to discrete values before they're rendered using an off-the-shelf renderer.

The output of the machine trained network 131 is a rough depiction of the building. The depiction may then be smoothed and/or textured using an image processor or renderer. The processing of the three-dimensional structure 143/depiction may be based on information included, for example, in the meta data of the image, other data in the geographic database 123 about the building, or derived from the image itself. In an example, the type of roof or exterior may be determined from the image and used to texture the building structure generated by the machine trained network 131. Renderers may also help with smoothing, as they can simulate smoothing on the surface of a model using a material or shader. Lines and or features may be added or removed where necessary.

The two-dimensional images 145 and three-dimensional structural models/images may be stored in the geographic database 123 for use by navigation applications or services. The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles or mobile device 122 travel through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 6:
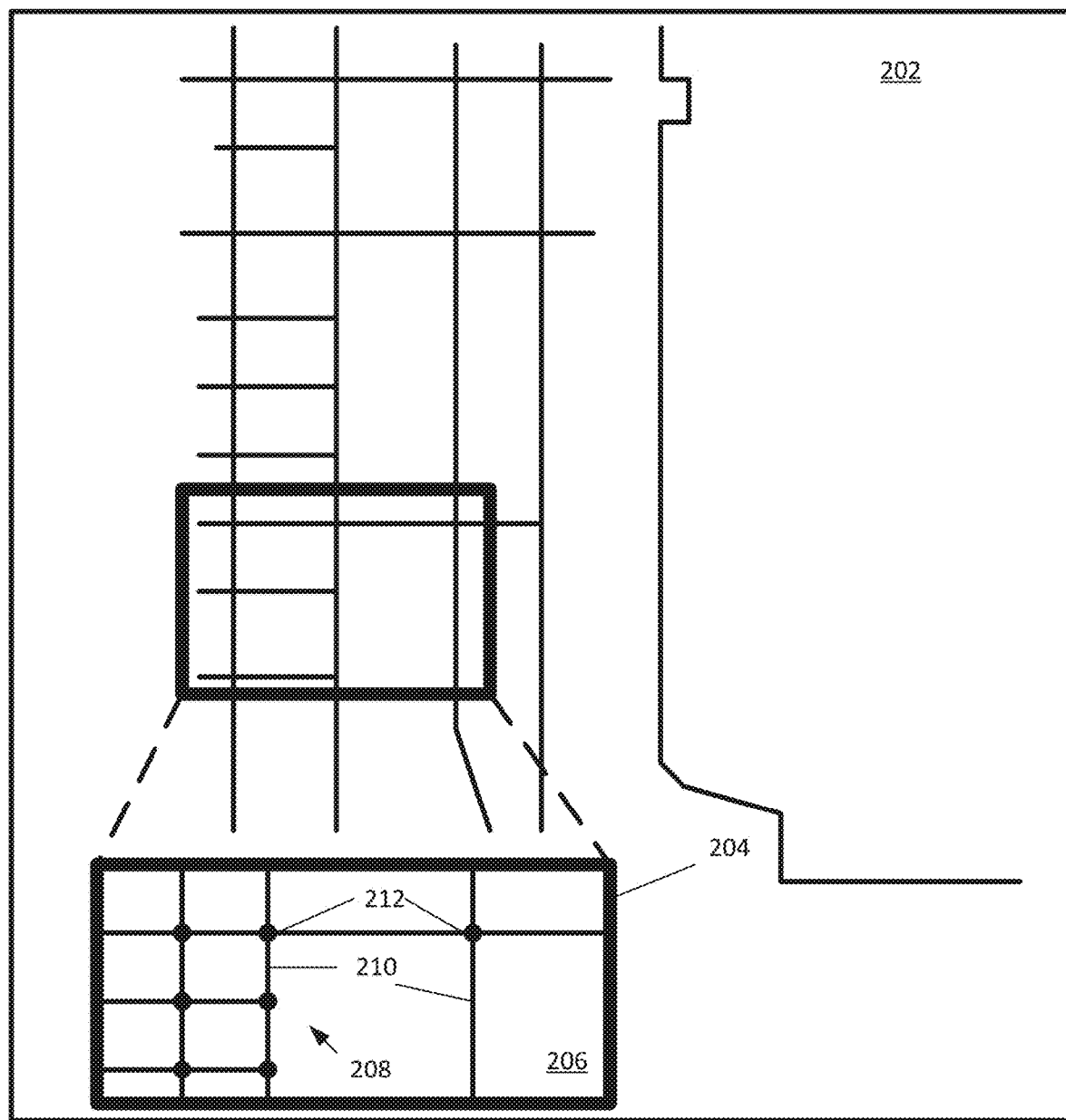
FIG. 6 depicts an example region of a geographic database.

FIG. 6 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc. FIG. 6 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 7:
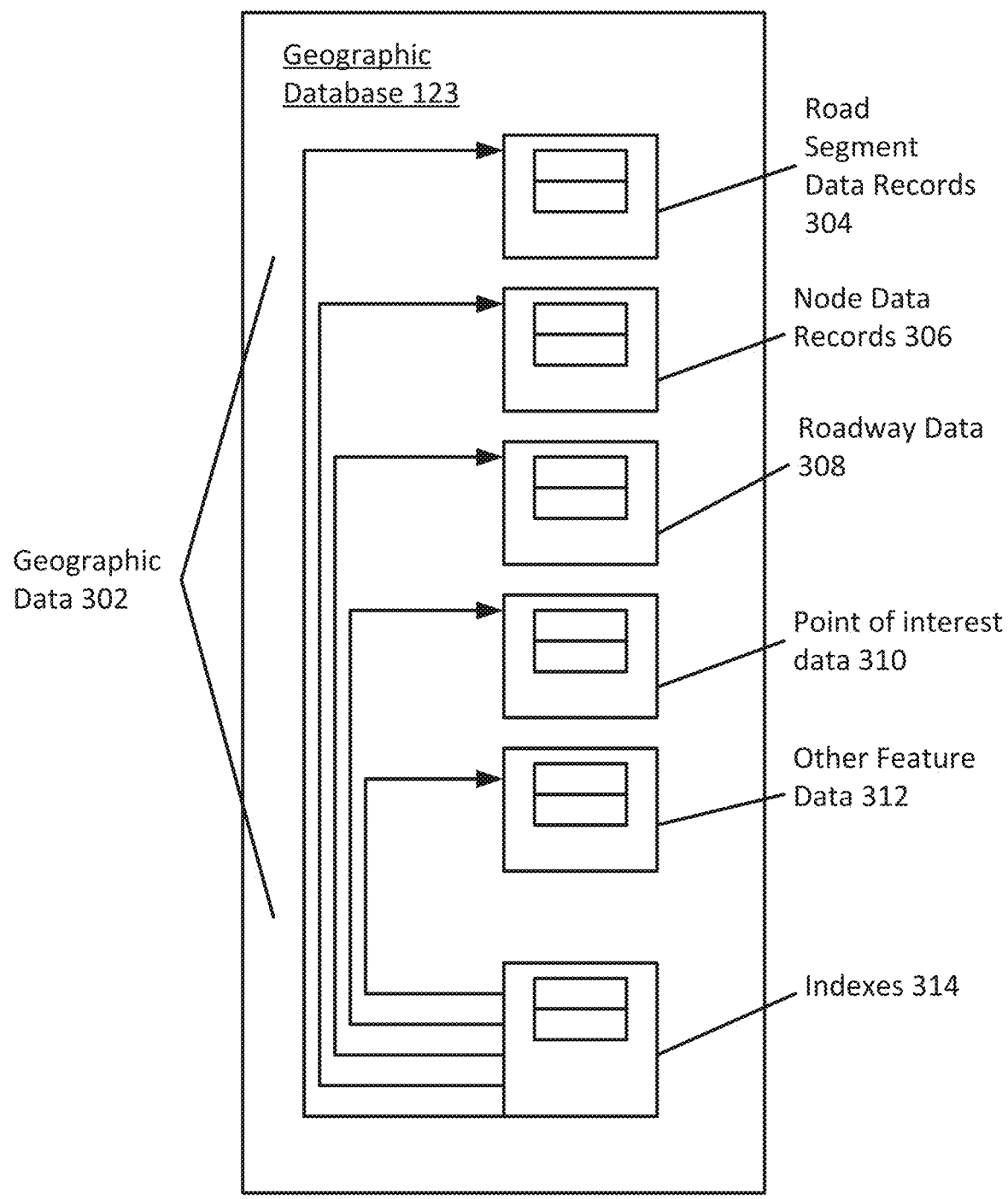
FIG. 7 depicts an example geographic database of FIG. 1.

As depicted in FIG. 7, in one embodiment, the geographic database 123 contains geographic data 302 that represents some of the geographic features in the geographic region 202 depicted in FIG. 6. The data 302 contained in the geographic database 123 may include data that represent the road network 208. In FIG. 7, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The point of interest data 310 may include data or sub-indices or layers for different types of points of interest. The point of interest data may include point of interest records comprising a type (e.g., the type of point of interest, such as restaurant, fuel station, hotel, city hall, police station, historical marker, ATM, golf course, truck stop, vehicle chain-up stations, etc.), location of the point of interest, a phone number, hours of operation, etc. The feature data 312 may include other roadway features. The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 8:
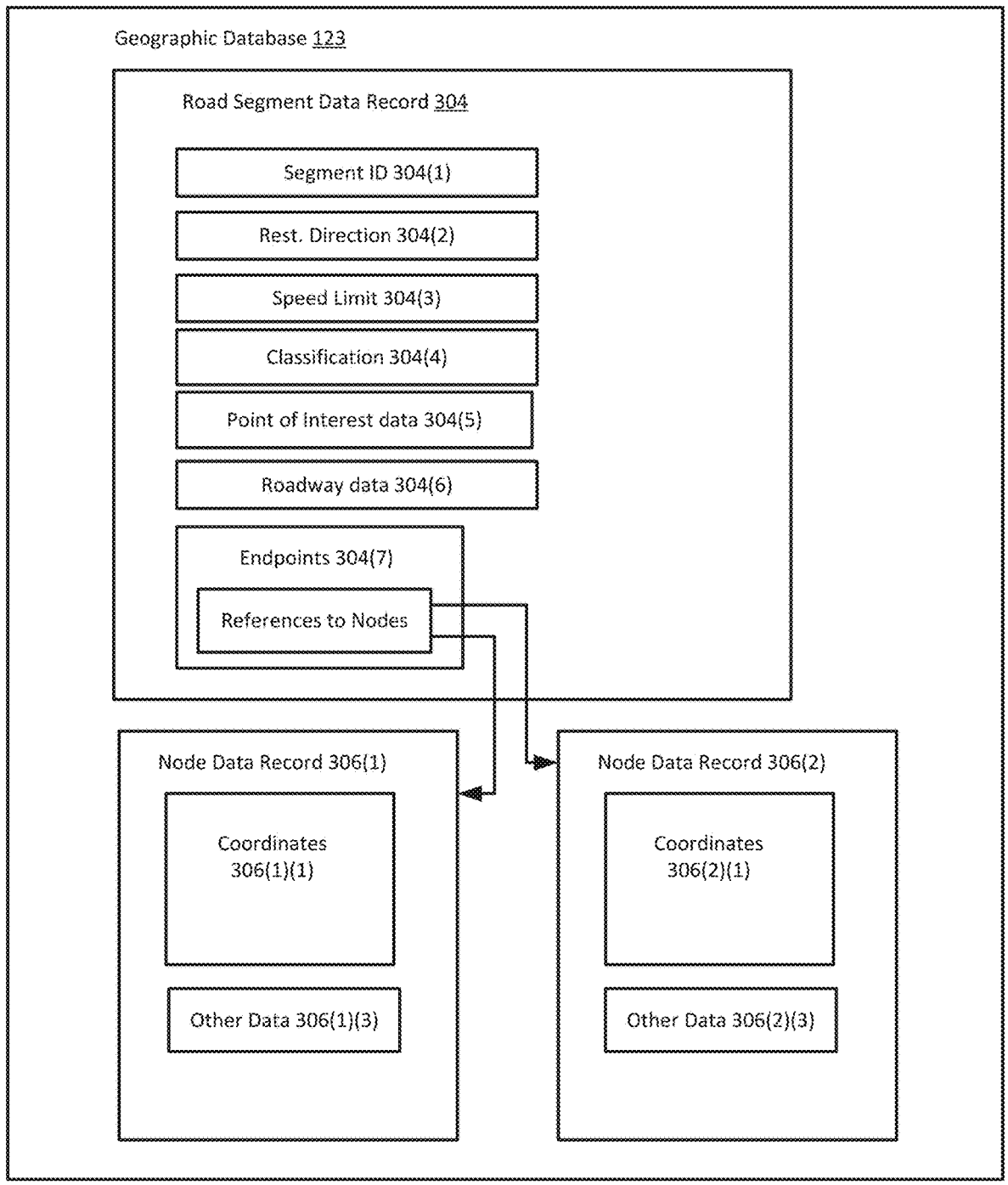
FIG. 8 depicts an example structure of the geographic database.

FIG. 8 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record, or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 8 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 8, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes. The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

In an embodiment, the geographic database 123 stores the three-dimensional structural models generated by the server 125. The three-dimensional structural models may be provided to the one or more devices 122 as navigation aids, for example when providing routing instructions or location-based information.

Figure 9:
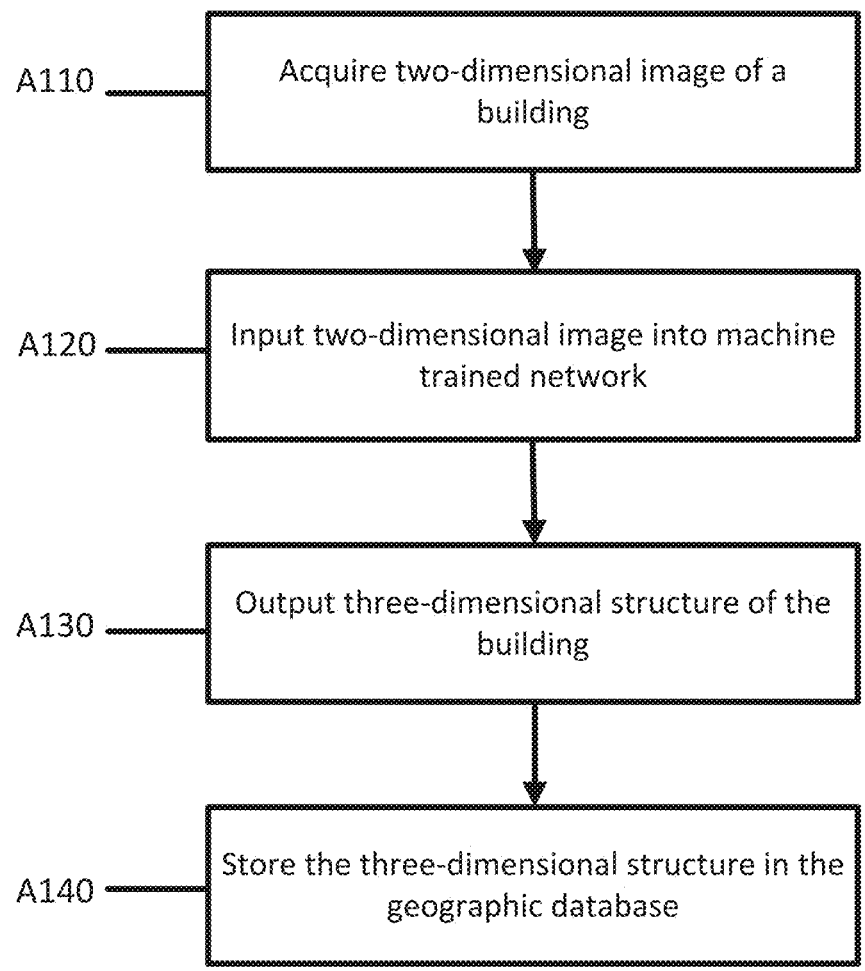
FIG. 9 depicts an example workflow for three-dimensional building generation from machine learning and topological models according to an embodiment.

FIG. 9 depicts a workflow for generating three-dimensional building models using the system of FIG. 1. As presented in the following sections, the acts may be performed using any combination of the components indicated in FIG. 1, 2, 10, or 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

Figure 10:
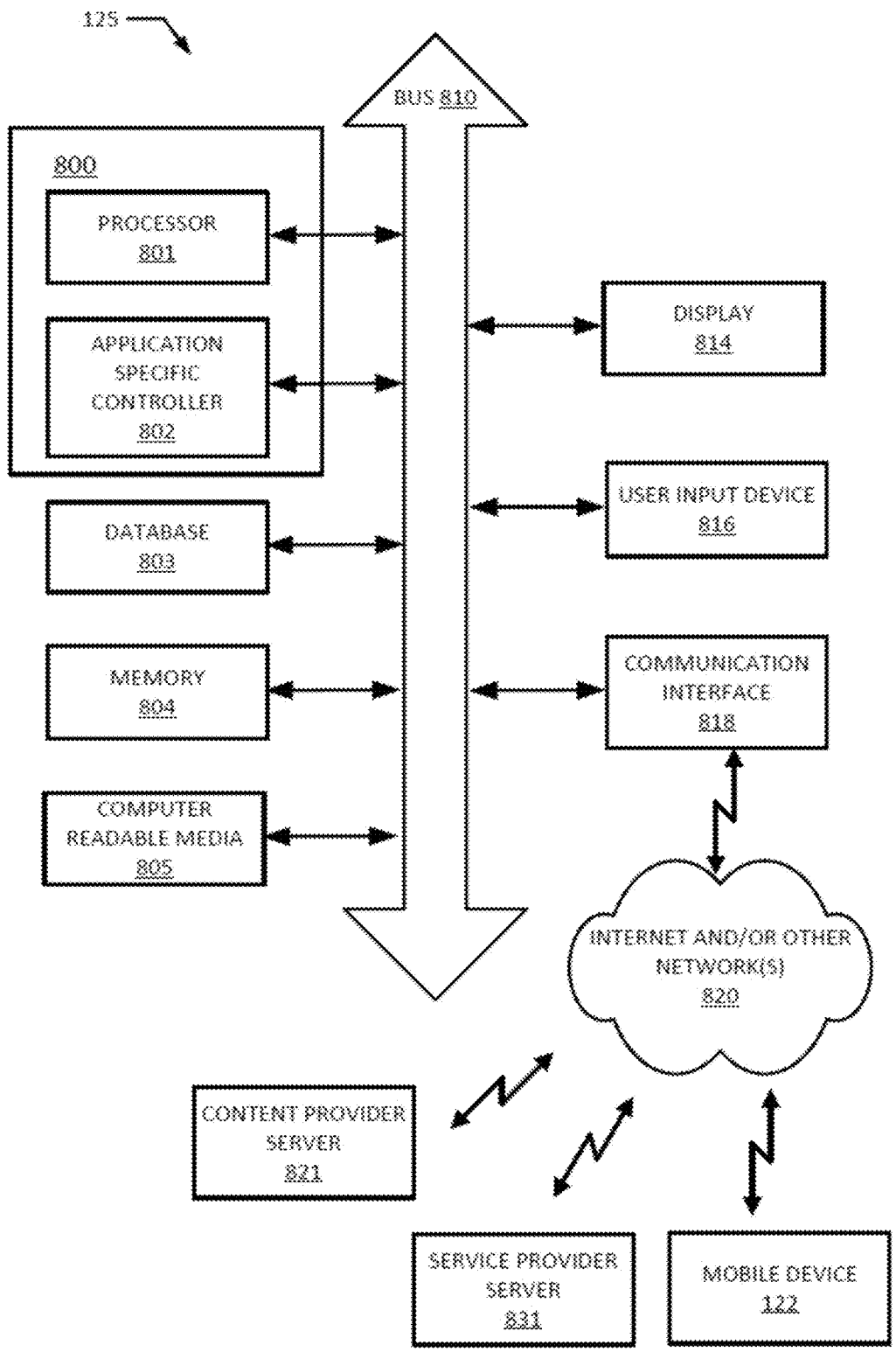
FIG. 10 depicts an example server of the system of FIG. 1 according to an embodiment.

FIG. 10 illustrates an example server 125 for the system of FIG. 1. The server 125 may include a bus 810 that facilitates communication between a controller that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 81 connected to the internet and/or other networks 820. The contents of database 803 are described with respect to database 123. The server-side database 803 may be a master database that provides data in portions to a database of the mobile device 122. Additional, different, or fewer components may be included.

The memory 804 and/or the computer readable medium 805 may include a set of instructions that can be executed to cause the server 125 to perform any one or more of the methods or computer-based functions disclosed herein. In a networked deployment, the system of FIG. 7 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 127/820 with a content provider server 821 and/or a service provider server 831. The server 125 may provide mapping data, for example depictions or structures of buildings, to the content provider server 821 and/or the service provider server 831. The content provider may include device manufacturers that provide location-based services associated with different locations POIs that users may access.

Referring back to FIG. 9, at Act A110, the server 125 acquires a two-dimensional image 145 of a building from a device 122 traversing the roadway. The two-dimensional image 145 may be acquired from, for example, a device 122 that is equipped with a camera or image capture device. The two-dimensional image 145 may be acquired at any point or for example, may be acquired in real time. One or more two-dimensional images 145 may be stored in the geographic database 123. As an example, probe vehicles may be configured to acquire image data related to buildings on the side of the roadway. The images are two-dimensional and may be stitched together to form a continuous view of the environment on the side of the roadway. Each of the two-dimensional images 145 may be used as the input to the server 125. Multiple images of a building may also be used, each image being transformed using the following process. The outputs may be compared, analyzed, and contrasted to generate the digital building model. The two-dimensional images 145 of the building may only provide a view of a front (or side or back) of a building. As such, the three-dimensional digital building generated by the server 125 may only be based on the visible side. Multiple views of the building may be combined from different three-dimensional digital representations.

In an embodiment, the two-dimensional image 145 includes meta data including at least position data for a location of the building (or the location of the device acquiring the two-dimensional image 145). The metadata may include attributes about an image, such as its height and width, in pixels. The metadata may describe the content of the image, the date and time of the image, etc. The metadata may be used by the server 125 when providing the three-dimensional building model to an application by, for example, locating the building in relation to the roadway or other structures.

At Act A120, the server 125 inputs the two-dimensional image 145 into a machine trained network 131 configured to generate three-dimensional structures 143 when input two-dimensional images 145 and a plurality of synthetic topology data generated using a generative adversarial network. The machine trained network 131 may be any type of network that is configured to generate three-dimensional structures 143 from two-dimensional images 145 using topology graph embeddings 137. Graph embeddings 137 are the transformation of property graphs to a vector or a set of vectors. The graph embeddings 137 learn a mapping from a network to a vector space, while preserving relevant network properties.

Figure 11:
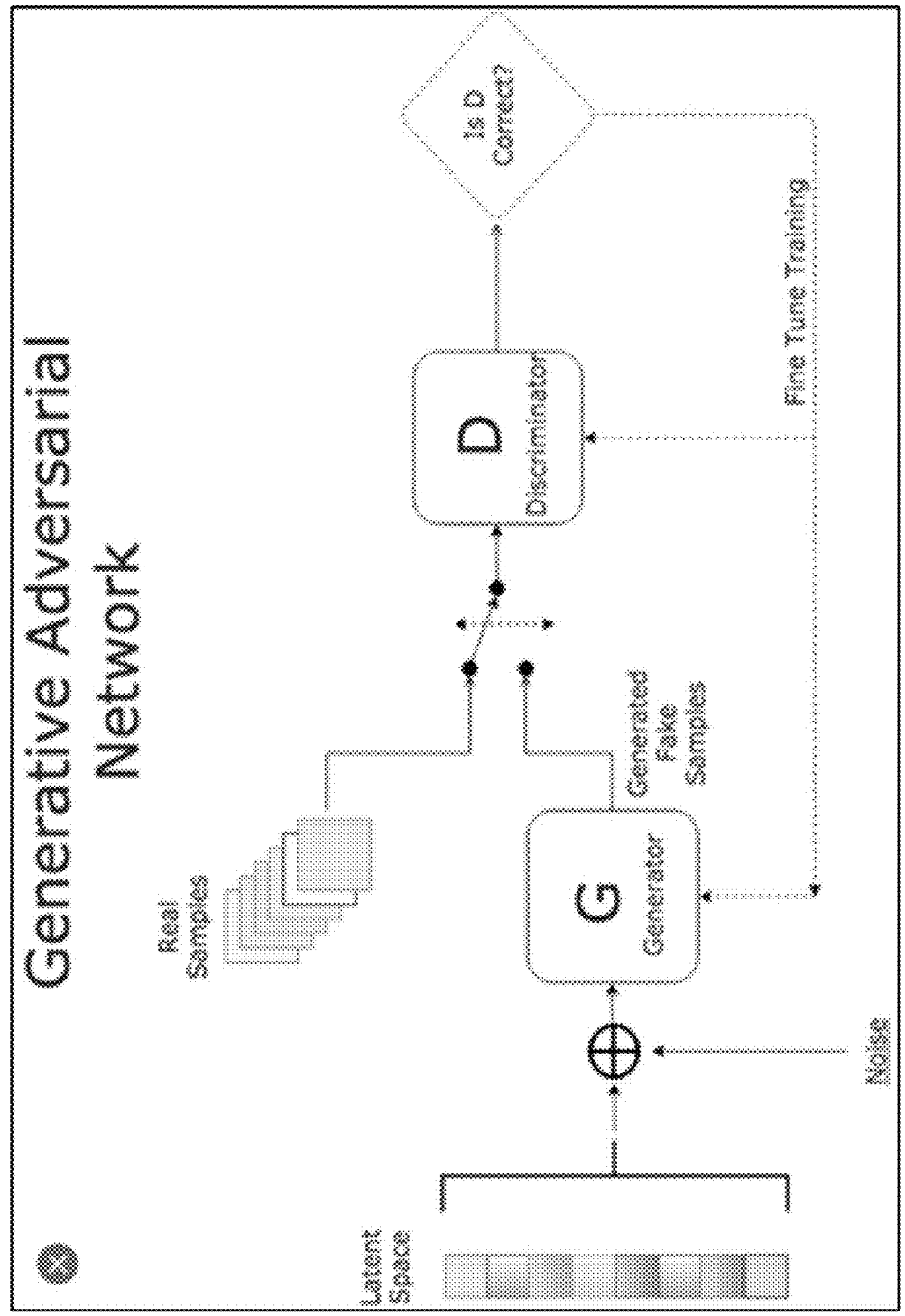
FIG. 11 depicts an example generative adversarial network.

In an embodiment, the graph embeddings 137 are generated using a GAN (also referred to as a BGAN 141). FIG. 11 depicts an example of a typical GAN. In an example, a classifier/discriminator (D) is configured to identify a series of images. An adversary generator (G) with the mission to fool D using carefully crafted images that look almost right but not quite. This is done by picking a legitimate sample randomly from training set (latent space) and synthesizing a new image by randomly altering its features (by adding random noise). During training, D is presented with a random mix of legitimate images from training data as well as fake images generated by G. Its task is to identify correct and fake inputs. Based on the outcome, both machines try to fine-tune their parameters and become better in what they do. If D makes the right prediction, G updates its parameters in order to generate better fake samples to fool D. If D's prediction is incorrect, it tries to learn from its mistake to avoid similar mistakes in the future. The reward for net D is the number of right predictions and the reward for G is the number D's errors. This process continues until an equilibrium is established and D's training is optimized.

In an embodiment, the latent noise concept of GAN is used to create fake nodes in addition to actual nodes (vertices), it is then fed into graph CNN to generate relationship of edges between all nodes. Post which BGAN 141 is used to generate random samples from seen sample of different structures of building based on relationship of vertices and edges and distance of those from bottom. The synthetic embeddings 137 are then fed into the machine trained network 131 to create digital structure of image (though metadata, the building may also be geo referenced).

In an embodiment, the machine trained network 131 is configured as an autoencoder. The autoencoders uses convolutional network to reduce the dimensionality of the input 2D image into a latent space, then use this latent space representation to reconstruct the 3D data. In an embodiment, the machine trained network 131 is configured as a graph-based end-to-end deep learning framework that takes a single image as input and transfers the 2D image to a 3D mesh model. In an embodiment, the machine trained network 131 models the 3D mesh directly by predicting the mesh faces and vertices sequentially using a transformer-based architecture. The network includes the vertex model and the face model. The vertex model is a masked transformer decoder that unconditionally expresses a distribution over vertex sequences to model the mesh vertices. Whereas the face model is a pointer network-based transformer that conditionally expresses a distribution over variable-length input vertex sequences to model the mesh faces. Alternative configurations may be used for the machine trained network 131. Any network may be used that inputs the two-dimensional image 145 and uses the synthetic topology embeddings 137 to generate a three-dimensional building structure of the two-dimensional image 145.

At Act A130, the server 125 outputs a three-dimensional building structure of the two-dimensional image 145. The three-dimensional building structure may be augmented by the server 125 with textures, colors, and building materials. An image processor/renderer may smooth and texture the three-dimensional building structure. At Act A140, the server 125 stores the three-dimensional building structure in the geographic database 123 along with any metadata included in the two-dimensional image 145 such as a location of the building. The three-dimensional building's structure may be used by navigation applications or services. A user, for example, may use the three-dimensional building structure visualized on an application to better navigate along a route.

In an embodiment, the device 122 is configured to acquire an image and provide a three-dimensional structure 143 to a user of the device 122. The image processing may be performed by the server 125 or by the device 122. Embodiments provide an efficient way to create three-dimensional buildings without any expensive equipment like Lidar or need to expensive manual methods like semantic segmentation. Topology adds value in addition to using the images only for creation of buildings. Since the generation of the three-dimensional buildings only requires smartphone or simple portable cameras, the system and method does not need to use expensive cars or setups to do data collection or testing. As an example, collecting data and generating three-dimensional building models can simply be accomplished using bicycles, scooters, pedestrians etc.

Figure 12:
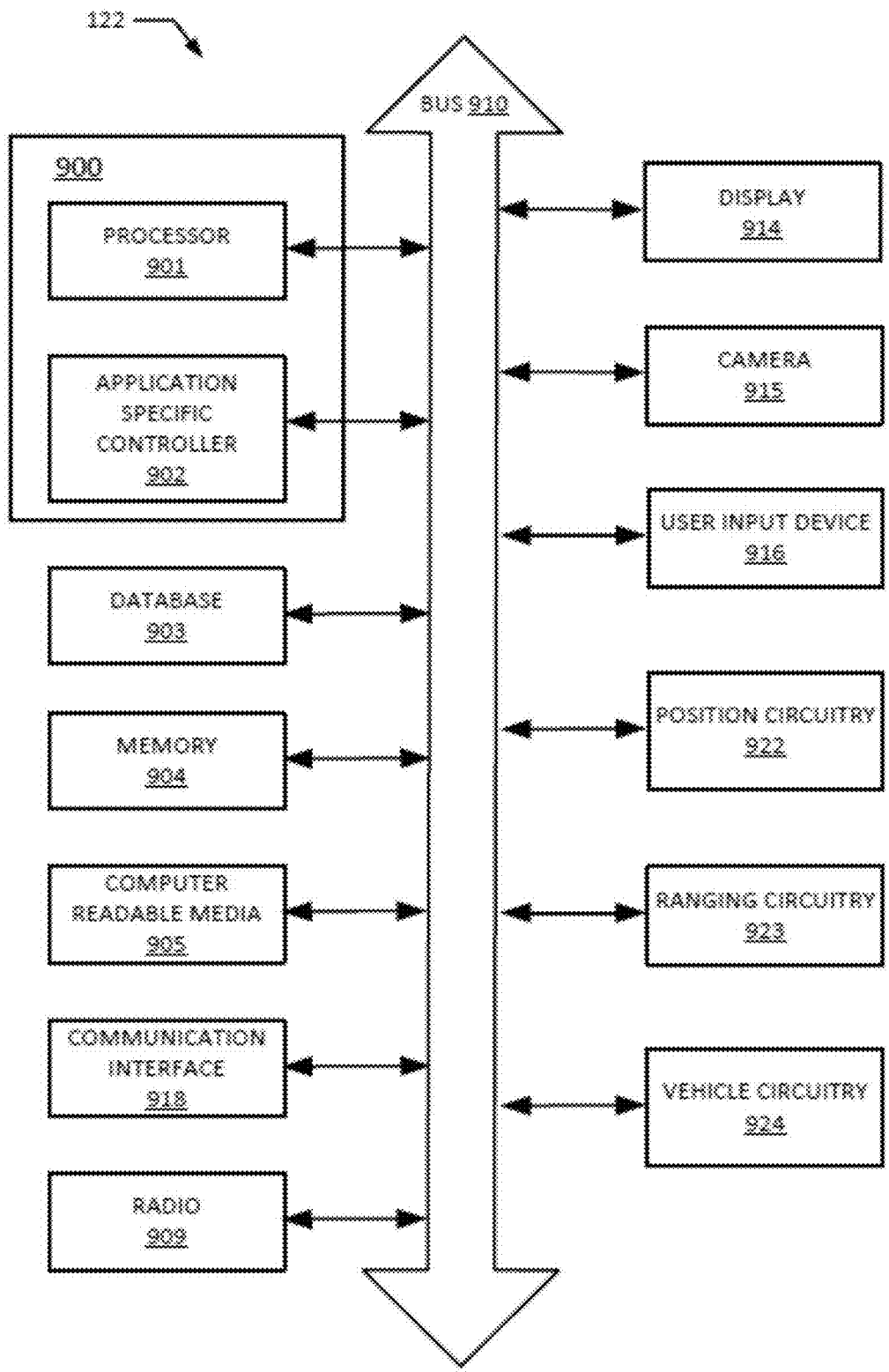
FIG. 12 depicts an example device of the system of FIG. 1 according to an embodiment.

FIG. 12 illustrates an example device 122 of the system of FIG. 1 that is configured to acquire a two-dimensional image 145 of a building and provide a three-dimensional digital depiction of the building. The mobile device 122 may include a bus 910 that facilitates communication between a controller that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the mobile device 122. The communication interface 918 connected to the internet and/or other networks (e.g., network 127 shown in FIG. 1). Additional, different, or fewer components may be included. The device 122 may be smart phone, a mobile phone, a personal digital assistant (PDA), a tablet computer, a notebook computer, a stationary computer, a IoT device, a remote sensor, a personal navigation device (PND), a portable navigation device, and/or any other known or later developed device that is configured to collect, transmit, receive, process, or display data. In an embodiment, a vehicle may be considered a device 122, or the device 122 may be integrated into a vehicle. The device 122 may receive or collect data from one or more sensors such as pressure sensors, proximity sensors, infrared sensors, optical sensors, image sensors, among others.

Figure 13:
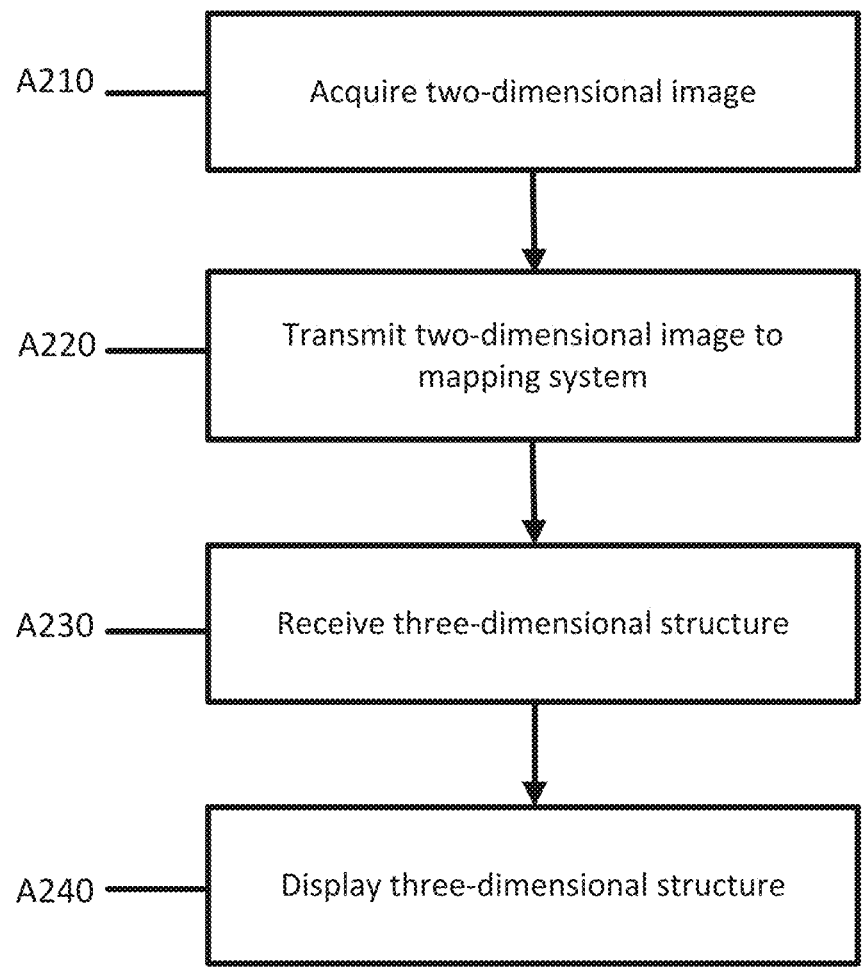
FIG. 13 depicts an example workflow for three-dimensional building generation from machine learning and topological models according to an embodiment.

FIG. 13 depicts a workflow for generating three-dimensional building models using two-dimensional images 145 from a portable device 122. As presented in the following sections, the acts may be performed using any combination of the components indicated in FIG. 1, 2, 10, or 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, the device 122 acquires a two-dimensional image 145 of a building using the camera 915. The device 122 may be configured with a camera 915 that collects images of the surrounding area. The images may be collected for the purpose of detecting objects in the vicinity of the device 122/vehicle, determining the position of a vehicle, or providing automated driving or assisted driving. In any of these examples, the images may be collected based on geocodes associates with the images. For example, a vehicle manufacturer, an individual user of the mobile device 122, or an application administrator, may index or store images according to geocodes describing the geographical location from where the images were collected. The geocode may include geographic coordinates (e.g., latitude and longitude). Metadata such as the geocode may include position information determined by the position circuitry 922 or the ranging circuitry 923. The metadata may include time data recorded in connection with the position information. The controller 900 may analyze the image data with respect to the metadata to determine whether to transmit the two-dimensional image 145 to the mapping system 121, for example if there is currently not a three-dimensional structure 143 of the building stored in the geographic database 123. The controller 900 may include a general processor, digital signal processor, an application specific integrated circuit (ASIC), field programmable gate array (FPGA), analog circuit, digital circuit, combinations thereof, or other now known or later developed processor. The controller 900 may be a single device or combinations of devices, such as associated with a network 127, distributed processing, or cloud computing. The controller 900 may receive updated instructions, traffic data, or other data such as three-dimensional building data. The controller 900 may be configured to acquire, store, score, and present data to a user or user interface as described herein.

At act A220, the device 122 transmits the two-dimensional image 145 to the mapping system 121. The device 122 may be configured to transmit and receive mapping data from a mapping system 121. The communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format. The radio 909 may be configured to radio frequency communication (e.g., generate, transit, and receive radio signals) for any of the wireless networks described herein including cellular networks, the family of protocols known as Wi-Fi or IEEE 802.11, the family of protocols known as Bluetooth, or another protocol.

The device 122 may receive data such as a route that is generated by a mapping system 121. The device 122 may receive data such as three-dimensional structure data that is generated by a mapping system 121 that relates to the two-dimensional image 145 provided by the device 122. The three-dimensional structure data may be used by the device 122 to visualize a route or location. The device 122 may generate and/or store the route or instructions in a memory 904 The memory 904 may be a volatile memory or a non-volatile memory. The memory 904 may include one or more of a read-only memory (ROM), random access memory (RAM), a flash memory, an electronic erasable program read only memory (EEPROM), or other type of memory. The memory 904 may be removable from the mobile device 122, such as a secure digital (SD) memory card. The memory 904 may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123.

At act A230, the device 122 receives a digital three-dimensional structure 143 of the building from the mapping system 121. The three-dimensional structure 143 of the building is generated using a machine trained network 131 that inputs the two-dimensional image 145 and a plurality of topology graph embeddings 137 generated by a BGAN 141. The machine trained network 131 outputs a three-dimensional structure 143 which then may be smoothed and rendered using one or more textures, for example derived from the two-dimensional image 145 or metadata associated therewith. The mapping system 121 stores the three-dimensional structure 143 of the building in the geographic database 123 that is made available to navigation applications and services that may be accessed by the device 122.

At act A240, the device 122 communicates the digital three-dimensional structure 143 to the user. The user may access the three-dimensional structures 143 using the input device 916 or the display 916. The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The three-dimensional structure 143 may be used by the user for navigating a route. The route may be provided by the device 122 or the mapping system 121 and may use sensor data from the device 122 and mapping data from the geographic database 123 to provide an efficient and accurate route. The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the road segment and node information provided to the navigation device 122. An autonomous vehicle or HAD may be configured to receive instructions from a mapping system 121 or the controller 201 and automatically perform an action.

The device 122 may be integrated in the vehicle, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle. The assisted driving device may include memory, a processor, and systems to communicate with the device 122. The assisted driving vehicles may response to geographic data received from geographic database 123 and the server 125, which may have been updated.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for generating three-dimensional digital buildings from two-dimensional images, the method comprising:
   acquiring a two-dimensional image of a building;
   inputting the two-dimensional image and a plurality of synthetic topology data into a machine trained network, wherein the machine learned network is configured to generate three-dimensional structures when input two-dimensional images and synthetic topology data, wherein the plurality of synthetic topology data is generated by a generator network that is trained using an adversarial process, the adversarial process comprising:
      converting topology models into real graph data comprising vertices and edges;
      inputting noise data into the generator network;
      outputting, by the generator network, synthetic graph data comprising at least one synthetic vertex;
      inputting, randomly, synthetic graph data generated by the generator network and real graph data into a discriminator network;
      attempting to determine, by the discriminator network, which inputs are synthetic graph data and which inputs are real graph data;
      adjusting, based on the attempt to determine, the generator network, the discriminator network, or the generator network and the discriminator network; and
      repeating inputting, outputting, inputting, attempting, and adjusting for a plurality of iterations or until the generator network and discriminator network converge;
   outputting, from the machine trained network, a three-dimensional building digital structure of the building; and
   providing the three-dimensional building digital structure.

2. The method of claim 1, wherein the plurality of synthetic topology data comprises a plurality of embeddings representing synthetic graphs of topology models of synthetic buildings.

3. The method of claim 2, wherein the embeddings comprise topology relationships that are translated to create a related structure using vertices and edges, the topology relationships comprising at least one of data related to a cluster, CellComplex, Cell, Shell, Face, Wire, Edge, or Vertex of the building.

4. The method of claim 1, wherein the machine trained network comprises an encoder decoder network.

5. The method of claim 1, further comprising:
   smoothing and texturing the three-dimensional building digital structure.

6. The method of claim 1, wherein providing comprises:
   storing the three-dimensional building digital structure in a geographic database with a location derived from meta data included with the two-dimensional image of the building; and
   generating a visualization of an area in a vicinity of a roadway using at least the three-dimensional building digital structure, wherein the visualization is used when providing a route to a user of a navigation application.

7. The method of claim 1, wherein the two-dimensional image is acquired by a portable mobile device.

8. A system for generating three-dimensional digital buildings from two-dimensional images, the system comprising:
   a communications interface configured to receive a two-dimensional image of a building;
   a building generative adversarial network configured to generate synthetic topology embeddings, the building generative adversarial network comprising a generator network and a discriminator network, wherein the synthetic topology data is generated by the generator network that is trained using an adversarial process, the adversarial process comprising:
      converting topology models into real graph data comprising vertices and edges;
      inputting noise data into the generator network;
      outputting, by the generator network, synthetic graph data comprising at least one synthetic vertex;
      inputting, randomly, synthetic graph data generated by the generator network and real graph data into the discriminator network;
      attempting to determine, by the discriminator network, which inputs are synthetic graph data and which inputs are real graph data;
      adjusting, based on the attempt to determine, the generator network, the discriminator network, or the generator network and the discriminator network; and
      repeating inputting, outputting, inputting, attempting, and adjusting for a plurality of iterations or until the generator network and discriminator network converge;
   a machine trained network configured to input the two-dimensional image and the synthetic topology embeddings and output a three-dimensional structure of the building; and
   a geographic database configured to store mapping data including at least the three-dimensional structure of the building for use by navigation applications and services.

9. The system of claim 8, wherein the communications interface is configured to receive the two-dimensional image from a portable device that is traversing a roadway.

10. The system of claim 8, wherein the synthetic topology embeddings describe topology relationships that are translated to create a related building structure using vertices and edges.

11. The system of claim 10, wherein the machine trained network comprises an encoder decoder network.

12. A non-transitory computer implemented storage medium that stores machine-readable instructions executable by at least one processor, the machine-readable instructions comprising:

acquiring a two-dimensional image of a building;

inputting the two-dimensional image and a plurality of synthetic topology data into a machine trained network, wherein the machine learned network is configured to generate three-dimensional structures when input two-dimensional images and a plurality of synthetic topology data, wherein the plurality of synthetic topology data is generated by a generator network that is trained using an adversarial process, the adversarial process comprising:

converting topology models into real graph data comprising vertices and edges;

inputting noise data into the generator network;

outputting, by the generator network, synthetic graph data comprising at least one synthetic vertex;

inputting, randomly, synthetic graph data generated by the generator network and real graph data into a discriminator network;

attempting to determine, by the discriminator network, which inputs are synthetic graph data and which inputs are real graph data;

adjusting, based on the attempt to determine, the generator network, the discriminator network, or the generator network and the discriminator network; and repeating inputting, outputting, inputting, attempting, and adjusting for a plurality of iterations or until the generator network and discriminator network converge;

outputting a three-dimensional building digital structure of the building; and providing the three-dimensional building digital structure.

13. The non-transitory computer implemented storage medium of claim 12, wherein the plurality of synthetic topology data comprises a plurality of embeddings representing synthetic graphs of topology models of synthetic buildings.

14. The non-transitory computer implemented storage medium of claim 13, wherein the plurality of embeddings is based off graph data including at least one of data related to a cluster, CellComplex, Cell, Shell, Face, Wire, Edge, or Vertex of the building.

15. The non-transitory computer implemented storage medium of claim 12, wherein the machine-readable instructions further comprise:

smoothing and texturing the three-dimensional building digital structure.

16. The non-transitory computer implemented storage medium of claim 12, wherein the machine-readable instructions for providing comprise:

storing the three-dimensional building digital structure in a geographic database with a location derived from meta data included with the two-dimensional image; and generating a visualization of an area in a vicinity of a roadway using at least the three-dimensional building digital structure, wherein the visualization is used when providing a route to a user of a navigation application.

* * * * *